United States Patent
Shi et al.

(10) Patent No.: US 10,636,228 B2
(45) Date of Patent: Apr. 28, 2020

(54) METHOD, DEVICE, AND SYSTEM FOR PROCESSING VEHICLE DIAGNOSIS AND INFORMATION

(71) Applicant: Tencent Technology (Shenzhen) Company Limited, Shenzhen, Guangdong (CN)

(72) Inventors: Xiao Shi, Shenzhen (CN); Renhua Du, Shenzhen (CN); Qian Wang, Shenzhen (CN); Xiangdong Zhu, Shenzhen (CN); Qiqi Zhu, Shenzhen (CN); Le Zhang, Shenzhen (CN); Wei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 151 days.

(21) Appl. No.: 15/710,305

(22) Filed: Sep. 20, 2017

(65) Prior Publication Data

US 2018/0012428 A1     Jan. 11, 2018

Related U.S. Application Data

(63) Continuation of application No. PCT/CN2016/108872, filed on Dec. 7, 2016.

(30) Foreign Application Priority Data

Dec. 29, 2015 (CN) .......................... 2015 1 1009733

(51) Int. Cl.
*G07C 5/08* (2006.01)
*G08G 1/00* (2006.01)
(Continued)

(52) U.S. Cl.
CPC ........... *G07C 5/0808* (2013.01); *G01C 21/20* (2013.01); *G06K 9/00825* (2013.01);
(Continued)

(58) Field of Classification Search
CPC ............. G07C 5/0808; G07C 2205/02; G07C 5/0825; G01C 21/20; G06K 9/00825; G08G 1/005; G08G 1/205
See application file for complete search history.

(56) References Cited

U.S. PATENT DOCUMENTS 5,781,872 A * 7/1998 Konishi ................. B60K 35/00
340/438
6,489,921 B1 * 12/2002 Wilkinson ......... G01C 21/3685
342/357.31
(Continued)

FOREIGN PATENT DOCUMENTS

CN         2695305 Y      4/2005
CN       101947945 A      1/2011
(Continued)

OTHER PUBLICATIONS

First Office Action corresponding to Chinese Patent Application No. 201511009733.2, dated Jul. 3, 2017, (5p).
(Continued)

*Primary Examiner* — Behrang Badii
*Assistant Examiner* — Daniel L Greene
(74) *Attorney, Agent, or Firm* — Brinks Gilson & Lione

(57) ABSTRACT

A method, a device, and a system for processing information of a vehicle are disclosed. In the embodiments, information about a connected vehicle is acquired, and a display image of a virtual vehicle is generated; driving information of the connected vehicle is acquired; whether the vehicle is currently in a driving state is determined according to the driving information; and when the connected vehicle is in
(Continued)

the driving state, an orientation of a head of the virtual vehicle is adjusted to keep consistency with an orientation of a head of the connected vehicle; and when the connected vehicle is in a non-driving state, an orientation of a head of the virtual vehicle is adjusted towards a location of the connected vehicle.

17 Claims, 9 Drawing Sheets

(51) Int. Cl.
G08G 1/005 (2006.01)
G01C 21/20 (2006.01)
G06K 9/00 (2006.01)

(52) U.S. Cl.
CPC ........... *G07C 5/0825* (2013.01); *G08G 1/005* (2013.01); *G08G 1/205* (2013.01); *G07C 2205/02* (2013.01)

(56) References Cited

U.S. PATENT DOCUMENTS

| 2003/0055689 | A1* | 3/2003 | Block | G06Q 20/206 |
| | | | | 705/5 |
| 2004/0260439 | A1* | 12/2004 | Endo | B60Q 1/48 |
| | | | | 701/36 |
| 2007/0057781 | A1* | 3/2007 | Breed | B60K 35/00 |
| | | | | 340/457.1 |
| 2011/0032357 | A1* | 2/2011 | Kitaura | B60R 1/00 |
| | | | | 348/148 |
| 2011/0037621 | A1* | 2/2011 | Fujiwara | G01C 21/26 |
| | | | | 340/995.27 |
| 2011/0074916 | A1* | 3/2011 | Demirdjian | B60R 1/00 |
| | | | | 348/36 |
| 2012/0200664 | A1* | 8/2012 | Lang | B60R 1/00 |
| | | | | 348/36 |
| 2015/0029018 | A1* | 1/2015 | Bowden | B60K 37/02 |
| | | | | 340/461 |
| 2015/0097860 | A1* | 4/2015 | Alaniz | G06F 3/011 |
| | | | | 345/633 |
| 2016/0300390 | A1* | 10/2016 | Malafeew | A63F 13/245 |
| 2017/0050743 | A1* | 2/2017 | Cole | B64D 43/00 |

FOREIGN PATENT DOCUMENTS

| CN | 102334149 A | 1/2012 | |
| CN | 103042972 A | 4/2013 | |
| CN | 103400508 A | 11/2013 | |
| CN | 103968822 A | 8/2014 | |
| CN | 104159212 A | 11/2014 | |
| CN | 104952120 A | 9/2015 | |
| CN | 105403415 A | 3/2016 | |
| DE | 102013219556 A1 * | 4/2015 | |
| DE | 102015003973 B3 * | 6/2016 | ............. G06F 3/011 |
| JP | 2-105012 A | 4/1990 | |
| JP | 09229705 A | 9/1997 | |
| JP | 2009299381 A | 12/2009 | |
| WO | WO 2009/128137 A1 | 10/2009 | |

OTHER PUBLICATIONS

International Search Report and Written Opinion dated Mar. 3, 2017 for PCT Application No. PCT/CN2016/108872, 19 pages.

* cited by examiner

METHOD, DEVICE, AND SYSTEM FOR PROCESSING VEHICLE DIAGNOSIS AND INFORMATION

RELATED APPLICATION

This application is a continuation application of PCT Patent Application No. PCT/CN2016/108872, filed on Dec. 7, 2016, which claims priority to Chinese Patent Application No. 201511009733.2, filed with the Chinese Patent Office on Dec. 29, 2015, both of which are incorporated herein by reference in their entireties.

FIELD OF THE TECHNOLOGY

The present disclosure relates to the field of communications technologies, and specifically, to a method, a device and a system for processing vehicle diagnosis and information.

BACKGROUND OF THE DISCLOSURE

With the development of communications technologies and the popularization of mobile terminals, there is an increasing variety of applications used on mobile terminals, among which a vehicle diagnosis system is a terminal application (APP) used for monitoring a vehicle condition.

Generally, an existing vehicle diagnosis system simply fixedly and statically displays a vehicle condition. For example, the system fixedly and statically displays a display image of a virtual vehicle at the center of a screen. When a user presses a scanning trigger key to trigger a scanning instruction, the system performs scanning according to the scanning instruction, and feeds back the vehicle condition to the user.

In a process of researching and practicing the existing technology, the inventor of the present disclosure finds that by means of the existing solution, a vehicle condition cannot be fed back in real time, and a vehicle cannot be accurately positioned.

SUMMARY

Embodiments of the present disclosure provide a method, a device and a system for processing vehicle diagnosis and information, to dynamically and truly feed back a vehicle condition in real time, and accurately position a vehicle.

An embodiment of the present disclosure provides a method for processing information of a vehicle, the method including:

acquiring, by a device comprising a display, a memory, and a processor in communication with the memory and the display, information about a connected vehicle which is connected to the device through a network, to obtain the information about the connected vehicle;

generating, by the device, a display image of a virtual vehicle according to the information about the connected vehicle to display the display image of the virtual vehicle on the display of the device;

acquiring, by the device, driving information of the connected vehicle;

determining, by the device according to the driving information, whether the connected vehicle is currently in a driving state;

when it is determined that the connected vehicle is in the driving state, adjusting, by the device, an orientation of a head of the virtual vehicle in the display image to keep consistency with an orientation of a head of the connected vehicle; and when it is determined that the connected vehicle is in a non-driving state, adjusting, by the device, the orientation of the head of the virtual vehicle in the display image towards a location of the connected vehicle.

Correspondingly, an embodiment of the present disclosure further provides a device for processing information of a vehicle, the device including:

a display;

a memory storing instructions; and a processor in communication with the memory and the display, wherein, when the processor executes the instructions, the processor is configured to cause the device to:

acquire information about a connected vehicle which is connected to the device through a network, to obtain the information about the connected vehicle, generate a display image of a virtual vehicle according to the information about the connected vehicle to display the display image of the virtual vehicle on the display of the device, acquire driving information of the connected vehicle, determine, according to the driving information, whether the connected vehicle is currently in a driving state, when it is determined that the connected vehicle is in the driving state, adjust an orientation of a head of the virtual vehicle in the display image to keep consistency with an orientation of a head of the connected vehicle, and when it is determined that the connected vehicle is in a non-driving state, adjust the orientation of the head of the virtual vehicle in the display image towards a location of the connected vehicle.

In addition, an embodiment of the present disclosure further provides a system for processing information of a vehicle, the system including:

a vehicle diagnosis system configured to provide information about a connected vehicle and driving information of the connected vehicle; and a device, comprising:

a display, a memory storing instructions, and a processor in communication with the memory and the display, wherein, when the processor executes the instructions, the processor is configured to cause the device to:

acquire, from the vehicle diagnosis system, the information about the connected vehicle which is connected to the device through a network, to obtain the information about the connected vehicle, generate a display image of a virtual vehicle according to the information about the connected vehicle to display on the display of the device, acquire, from the vehicle diagnosis system, the driving information of the connected vehicle to obtain the driving information of the connected vehicle, determine, according to the driving information, whether the connected vehicle is currently in a driving state, when it is determined that the connected vehicle is in the driving state, adjust an orientation of a head of the virtual vehicle in the display image to keep consistency with an orientation of a head of the connected vehicle, and when it is determined that the connected vehicle is in a non-driving state, adjust the orientation of the head of the virtual vehicle in the display image towards a location of the connected vehicle.

In the embodiments of the present disclosure, information about a connected vehicle is acquired, and a display image of a virtual vehicle is generated according to the information about the connected vehicle; driving information of the connected vehicle is acquired; whether the vehicle is currently in a driving state is determined according to the driving information; and an orientation of a head of the virtual vehicle in the display image is adjusted if the connected vehicle is in the driving state, so that the orientation of the head of the virtual vehicle keeps consistency with an orientation of a head of the connected vehicle; or an orientation of a head of the virtual vehicle in the display image is adjusted if the connected vehicle is in a non-driving state, such as a parking state, so that the head of the virtual vehicle is oriented to a location of the connected vehicle, thereby displaying a vehicle condition in real time, dynamically, and truly. Moreover, the location of the physical vehicle can be more accurately determined by using the orientation of the head of the virtual vehicle in the display image. Therefore, compared with the solution in the existing technology that a display image of a virtual vehicle is fixed, a vehicle can be more accurately located. In conclusion, by means of the solution, not only a vehicle condition can be fed back in real time, dynamically and truly, but also a vehicle can be more accurately positioned, so that it is especially convenient for a user to find the vehicle.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons skilled in the art may derive other drawings from these accompanying drawings.

DESCRIPTION OF EMBODIMENTS

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments in the present disclosure without creative efforts shall fall within the protection scope of the present disclosure.

Embodiments of the present disclosure provide a method, a device and a system for processing vehicle diagnosis and information.

Figure 1A:
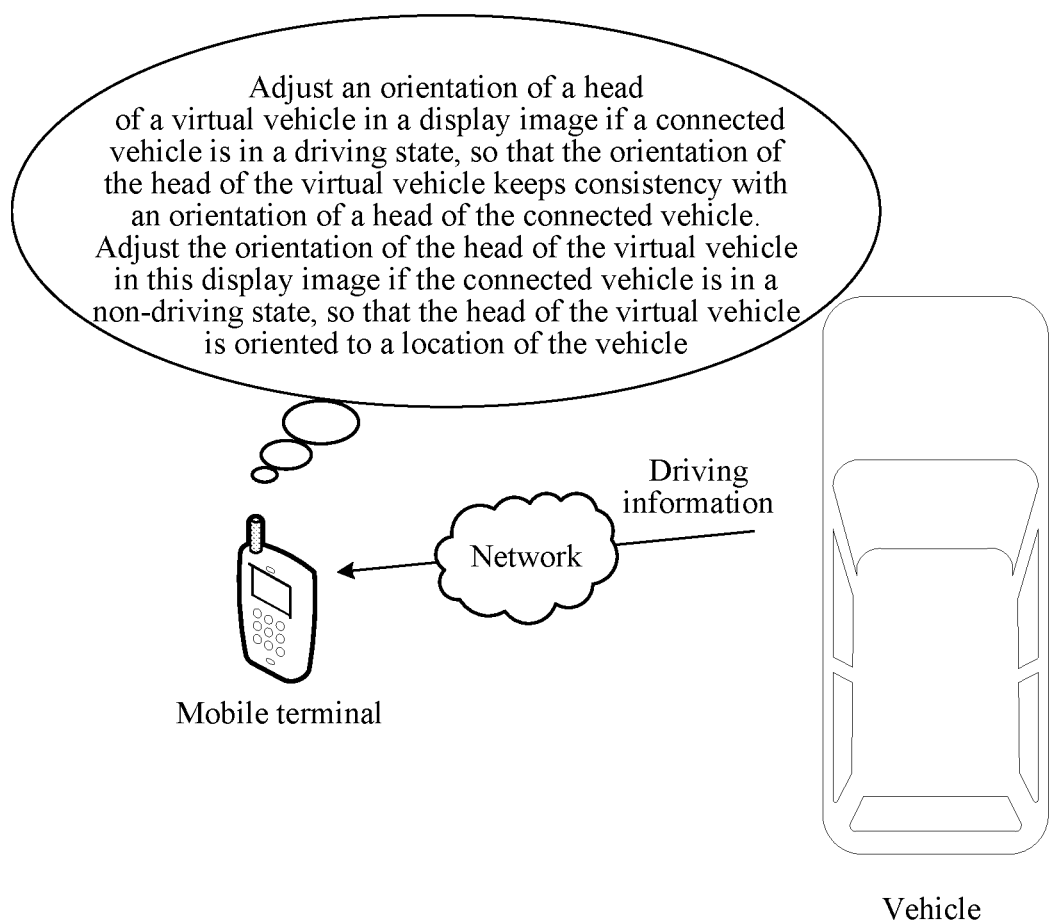
FIG. 1A is a schematic diagram of a scenario of a vehicle diagnosis system according to an embodiment of the present disclosure.

As shown in FIG. 1A, the data processing system may include a data processing apparatus and a vehicle diagnosis system. The vehicle diagnosis system may be disposed in a vehicle that needs to be monitored. That is, a connected vehicle as described in the embodiments of the present disclosure. The data processing apparatus may be integrated into a mobile terminal, for example, may be integrated into a mobile terminal in a form of a functional module, or installed on a mobile terminal in a form of software such as a mobile terminal application. A user may connect a physical vehicle with the data processing apparatus, so that the vehicle diagnosis system in the physical vehicle is connected with the data processing apparatus to establish a communication relationship between the vehicle diagnosis system and the data processing apparatus. Then the physical vehicle may be monitored by using the vehicle diagnosis system to obtain information. Further the vehicle diagnosis system transmits the information to the data processing apparatus such as the mobile terminal.

For example, the data processing apparatus may acquire information from the vehicle diagnosis system about a connected vehicle, which is a vehicle connected to the data processing apparatus. The data processing apparatus may generate a display image of a virtual vehicle according to the information about the connected vehicle and acquire driving information of the connected vehicle from the vehicle diagnosis system. The data processing apparatus may also determine, according to the driving information, whether the vehicle is currently in a driving state. When the vehicle is in the driving state, the data processing apparatus may adjust an orientation of a head of the virtual vehicle in the display image to keep consistency with an orientation of a head of the connected vehicle; when the vehicle is not in the driving state, or, the vehicle is in a non-driving state or a parking state, the data processing apparatus may adjust an orientation of a head of the virtual vehicle in the display image towards a location of the connected vehicle. Therefore, this disclosure can dynamically and truly feed back information of a vehicle in real time, and accurately locate the vehicle.

Detailed descriptions are made below separately.

Embodiment 1

A description is provided in an embodiment from a perspective of a data processing apparatus. The data processing apparatus may be specifically integrated into a device such as a mobile terminal. The mobile terminal may be specifically a device such as a mobile phone or a tablet computer.

A data processing method for a vehicle diagnosis system includes: acquiring information about a vehicle connected to a device, to obtain the information about the connected vehicle, and generating a display image of a virtual vehicle according to the information about the connected vehicle; acquiring driving information of the connected vehicle; determining, according to the driving information, whether the vehicle is currently in a driving state; and adjusting an orientation of a head of the virtual vehicle in the display image when the connected vehicle is in the driving state, so that the orientation of the head of the virtual vehicle keeps consistency with an orientation of a head of the connected vehicle; or adjusting an orientation of a head of the virtual vehicle in the display image when the connected vehicle is in a non-driving state or a parking state, so that the head of the virtual vehicle is oriented towards a location of the connected vehicle.

Figure 1B:
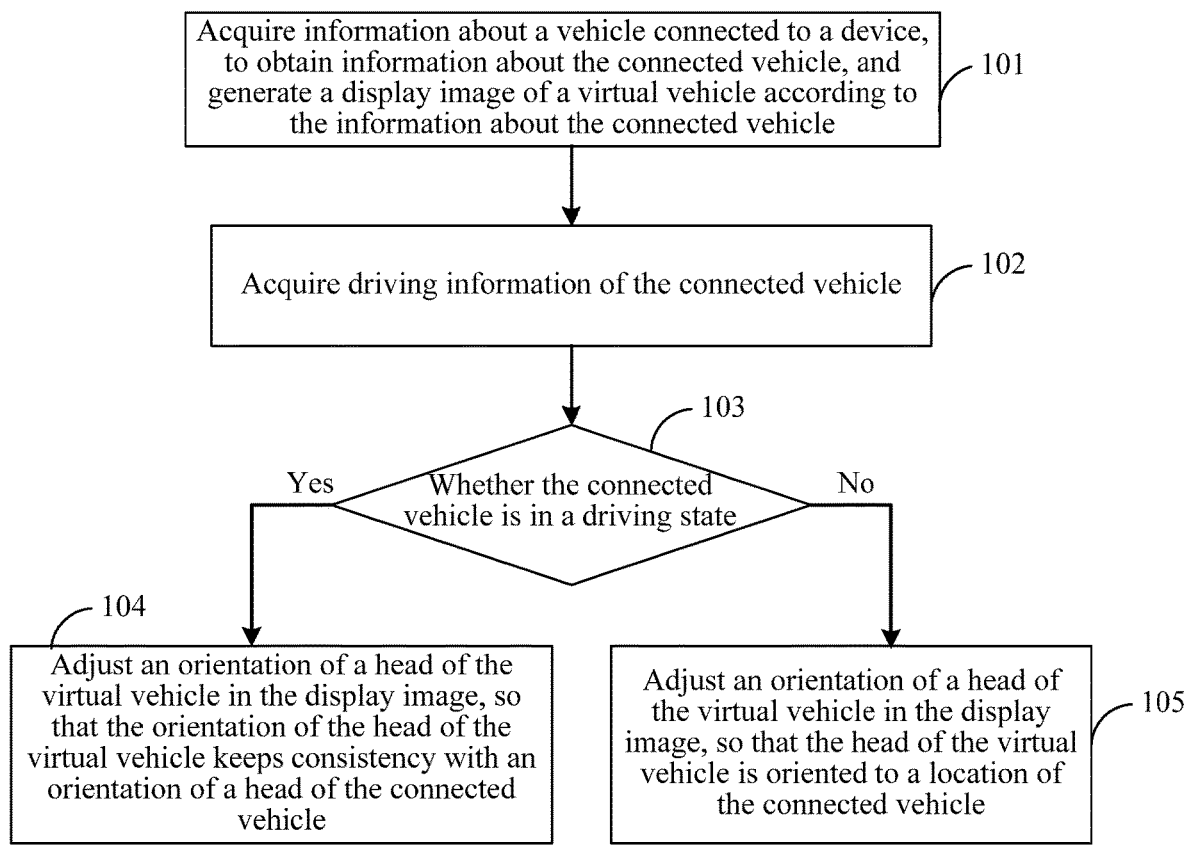
FIG. 1B is a flowchart of a data processing method for a vehicle diagnosis system according to an embodiment of the present disclosure.

As shown in FIG. 1B, a specific process of the data processing method for a vehicle diagnosis system may be as below.

101. Acquire information about a vehicle connected to a device (that is, a data processing apparatus), to obtain information about the connected vehicle, and generate a display image of a virtual vehicle according to the information about the connected vehicle.

The vehicle connected to the device is a vehicle that has an association relationship with the device. The association relationship includes a communication connection relationship, a friendship, or the like. For ease of description, in this embodiment of the present disclosure, the association relationship is referred to as a connecting relationship.

For example, the information about the connected vehicle sent by a vehicle diagnosis system corresponding to the connected vehicle may be received, then the display image of the virtual vehicle may be generated according to the information about the connected vehicle, and the display image may be displayed on a local (for example, a mobile terminal to which the data processing apparatus belongs) screen.

Alternatively, for another example, the information about the connected vehicle input by a user may be received, then the display image of the virtual vehicle may be generated according to the information about the connected vehicle, and the display image may be displayed on a local (for example, a mobile terminal to which the data processing apparatus belongs) screen.

The connected vehicle may be preset in the data processing apparatus by the user, or may be connected to the data processing apparatus by the data processing apparatus. That is, before the step of "acquiring information about a connected vehicle", the data processing method for a vehicle diagnosis system may further include:

receiving a connecting request, the connecting request carrying an identifier of a vehicle that needs to be monitored; and establishing, according to the connecting request, a connecting relationship between the data processing apparatus and the vehicle corresponding to the identifier.

In this case, the step of "acquiring information about a connected vehicle" may be specifically: acquiring the information about the connected vehicle based on the connecting relationship.

It should be noted that because the vehicle diagnosis system is installed on the vehicle, after the connecting relationship between the data processing apparatus and the vehicle is established, a communication relationship between the vehicle diagnosis system in the physical vehicle and the data processing apparatus may be established. For example, an identifier of the vehicle diagnosis system on the corresponding vehicle may be carried in the information about the connected vehicle. In this way, the data processing apparatus may communicate with the vehicle diagnosis system by using the identifier of the vehicle diagnosis system. Alternatively, an identifier of a mobile terminal to which the data processing apparatus belongs may be input in the vehicle diagnosis system. In this case, after receiving a connection request sent by the vehicle diagnosis system, the data processing apparatus may establish a connection relationship with the vehicle diagnosis system. Alternatively, the data processing apparatus may establish a connection relationship with the vehicle diagnosis system by logging in to a same account.

102. Acquire driving information of the connected vehicle.

For example, the driving information of the connected vehicle sent by the vehicle diagnosis system may be received. The driving information is collected by the vehicle diagnosis system.

The driving information is information that can reflect whether the vehicle is currently in a driving state, and may include information such as gear information, vehicle speed information, and whether an engine of the vehicle is running.

103. Determine, according to the driving information, whether the connected vehicle is currently in a driving state, and if the connected vehicle is in the driving state, perform step 104, or otherwise, if the connected vehicle is in a non-driving state, perform step 105.

The non-driving state may include a stopping state and a parking state, for example, parking a vehicle in a parking lot.

104. Adjust an orientation of a head of the virtual vehicle in the display image when it is determined that the connected vehicle is in the driving state, so that the orientation of the head of the virtual vehicle keeps consistency with an orientation of a head of the connected vehicle. For example, details may be as below:

acquiring head information of the connected vehicle in real time, the head information indicating the orientation of the head of the connected vehicle, and then adjusting the orientation of the head of the virtual vehicle in the display image in real time according to the head information, so that the orientation of the head of the virtual vehicle keeps consistency with the orientation of the head of the connected vehicle.

For example, the orientation of the head of the virtual vehicle in the display image may be adjusted in real time by using a local (that is, the data processing apparatus or a mobile terminal to which the data processing apparatus belongs) gyroscope according to the head information, so that the orientation of the head of the virtual vehicle keeps consistency with the orientation of the head of the connected vehicle.

The head information of the connected vehicle may be provided by the vehicle diagnosis system. For example, the vehicle diagnosis system may detect the orientation of the head of the vehicle in real time, to obtain the head information, and then send the head information to the data processing apparatus. The vehicle diagnosis system may detect the orientation of the head of the vehicle in real time in various manners. For example, the orientation of the head of the vehicle may be determined by installing a positioning apparatus at the head or a tail of the vehicle to detect the orientation of the vehicle.

105. Adjust an orientation of a head of the virtual vehicle in the display image when it is determined that the connected vehicle is in a non-driving state, so that the head of the virtual vehicle is oriented to a location of the vehicle. For example, details may be as below:

when it is determined that the connected vehicle is in the non-driving state, such as a parking state or a stopping state, acquiring positioning information of the connected vehicle, to obtain a vehicle location; acquiring a current location of the device (that is, the data processing apparatus), to obtain the current location; and adjusting the orientation of the head of the virtual vehicle in the display image in real time according to the vehicle location and the current location of the device, so that the head of the virtual vehicle is oriented to the vehicle location.

For example, the orientation of the head of the virtual vehicle in the display image may be adjusted in real time by using a local (that is, the data processing apparatus or a mobile terminal to which the data processing apparatus belongs) gyroscope according to the vehicle location and the current location information, so that the head of the virtual vehicle is oriented to the vehicle location.

The positioning information of the connected vehicle may be provided by the vehicle diagnosis system. For example, the vehicle diagnosis system may position the connected vehicle, to obtain the positioning information, and then send the positioning information to the data processing apparatus, such as the mobile terminal.

In this way, when the user parks the vehicle at a place and leaves the vehicle with the data processing apparatus such as the mobile terminal, the vehicle diagnosis system may send the vehicle location to the data processing apparatus, and then the data processing apparatus may label a direction of the vehicle according to the vehicle location, so that it is convenient for the user to find the vehicle.

The vehicle diagnosis system may position the vehicle in various manners. For example, the vehicle may be positioned by installing a Global Positioning System (GPS) on the vehicle or by using a base station, and details are not described herein.

Optionally, to enable the user to find the vehicle of the user more conveniently, corresponding navigation information for reaching the location of the vehicle may further be generated for the reference of the user. That is, after the step of "adjusting an orientation of a head of the virtual vehicle in the display image, so that the head of the virtual vehicle is oriented to a location of the connected vehicle", the data processing method for a vehicle diagnosis system may further include:

receiving a navigation request; generating, according to the navigation request, a navigation route for reaching the location of the connected vehicle; and displaying the navigation route.

Optionally, a vehicle condition of the connected vehicle may further be scanned, and corresponding vehicle condition information may be provided for the user. That is, the data processing method for a vehicle diagnosis system may further include:

receiving a vehicle diagnosis request; scanning a vehicle condition of the connected vehicle according to the vehicle diagnosis request, to obtain vehicle condition information; and displaying the vehicle condition information.

For example, after the vehicle diagnosis request is received, a diagnosis instruction may be delivered to the vehicle diagnosis system according to the vehicle diagnosis request, so that the vehicle diagnosis system scans the connected vehicle to obtain the vehicle condition of the connected vehicle according to the diagnosis instruction. The data processing apparatus receives a scanning result returned by the vehicle diagnosis system, to obtain the vehicle condition information, and then displays the vehicle condition information. For example, the vehicle condition information may be displayed at a preset location on the display image of the virtual vehicle, or the vehicle condition information may be sent to the user by using a short message, a text message, a popup window, another message form or the like.

It may be learned from above that in this embodiment, information about a connected vehicle is acquired, and a display image of a virtual vehicle is generated according to the information about the connected vehicle; driving information of the connected vehicle is acquired; whether the vehicle is currently in a driving state is determined according to the driving information; and an orientation of a head of the virtual vehicle in the display image is adjusted when the connected vehicle is in the driving state, so that the orientation of the head of the virtual vehicle keeps consistency with an orientation of a head of the connected vehicle; or an orientation of a head of the virtual vehicle in the display image is adjusted when the connected vehicle is in a non-driving state, such as a parking state, so that the head of the virtual vehicle is oriented to a location of the connected vehicle, thereby displaying a vehicle condition in real time, dynamically, and truly. Moreover, the location of the physical vehicle can be more accurately determined by using the orientation of the head of the virtual vehicle in the display image. Therefore, compared with the solution in the existing technology that a display image of a virtual vehicle is fixed, a vehicle can be more accurately positioned. In conclusion, by means of the solution, not only a vehicle condition can be fed back in real time, dynamically and truly, but also a vehicle can be more accurately positioned, so that it is especially convenient for a user to find the vehicle.

Embodiment 2

According to the method described in Embodiment 1, a detailed description is further made below with an example.

In this embodiment, a description is made by using an example in which the data processing apparatus is specifically integrated into a mobile terminal. The data processing apparatus may be integrated into the mobile terminal in a form of a functional module, or may be installed on the mobile terminal in a form of software such as a mobile terminal application.

Figure 2A:
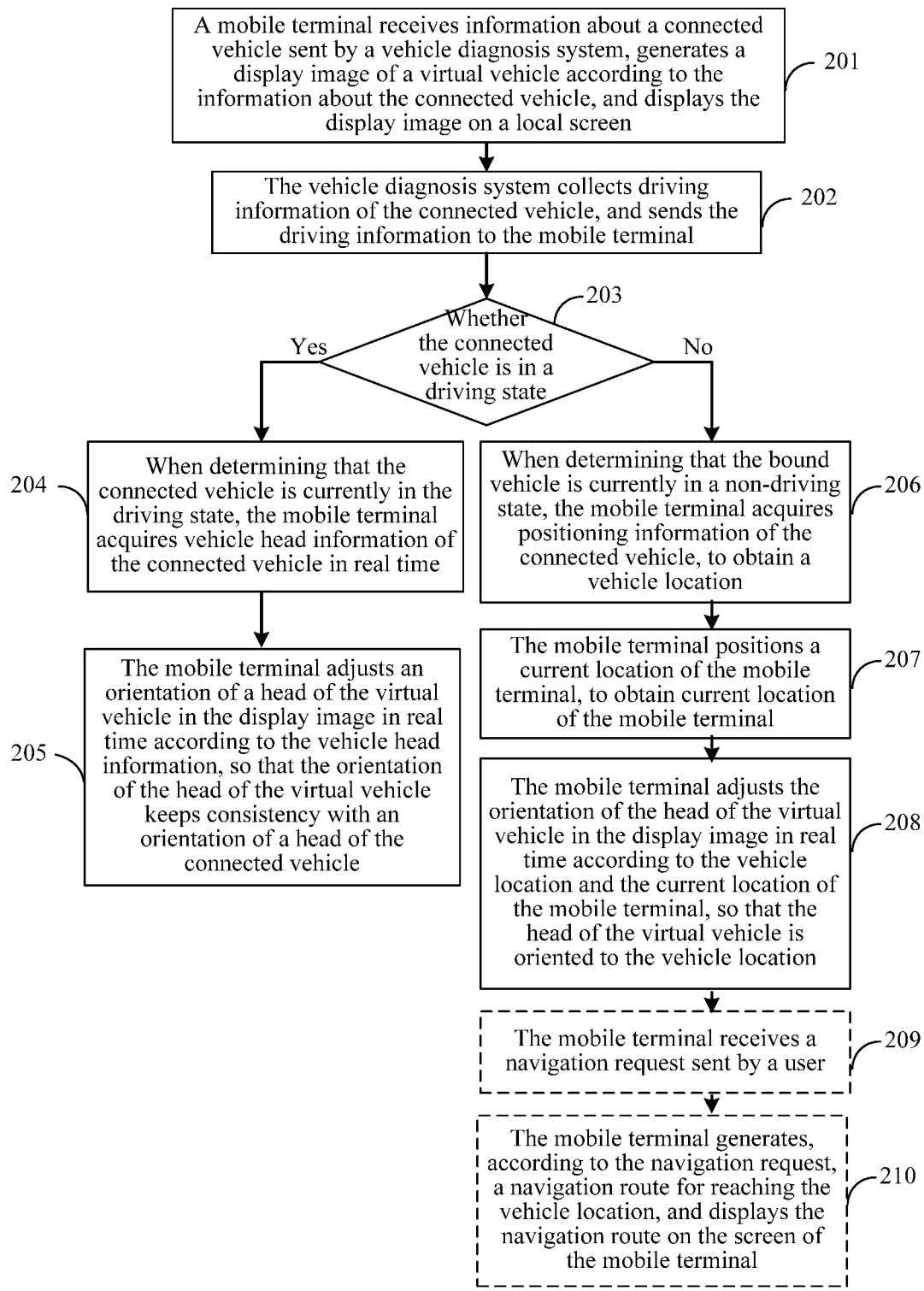
FIG. 2A is another flowchart of a data processing method for a vehicle diagnosis system according to an embodiment of the present disclosure.
Figure 2B:
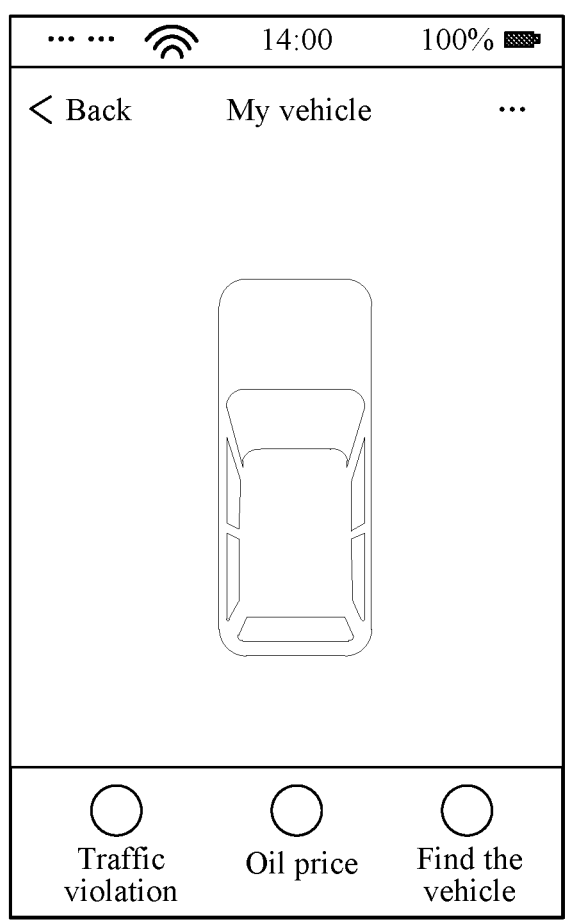
FIG. 2B is an exemplary diagram of a display image of a virtual vehicle in a vehicle diagnosis system according to an embodiment of the present disclosure.

As shown in FIG. 2A, a specific process of a data processing method for a vehicle diagnosis system may be as below:

201. A mobile terminal receives information about a connected vehicle sent by a vehicle diagnosis system, generates a display image of a virtual vehicle according to the information about the connected vehicle, and displays the display image on a local (that is, the mobile terminal) screen. For example, refer to FIG. 2B.

The display image may further provide other information, such as oil price information, and queried information about traffic violation corresponding to the connected vehicle. The connected vehicle may be connected to the mobile terminal directly by wire/cable or be connected to the mobile terminal via wireless communication.

The connected vehicle may be preset in the mobile terminal (that is, the data processing apparatus) by a user, or may be connected to the mobile terminal by the mobile terminal. For example, before the information about the connected vehicle is acquired, a connecting request may be received. The connecting request carries an identifier of a vehicle that needs to be monitored, and then a connecting relationship is established, according to the connecting request, between the mobile terminal and the vehicle corresponding to the identifier of the vehicle.

The connecting request may be input by the user. The mobile terminal may display a list of vehicles that have a friendship or another association relationship with the user.

Then the user makes a selection on the list of vehicles, to trigger the connecting request.

202. The vehicle diagnosis system collects driving information of the connected vehicle, and sends the driving information to the mobile terminal.

The driving information is information that can reflect whether the vehicle is currently in a driving state, and may include information such as gear information, vehicle speed information, and whether an engine of the vehicle is running.

203. When receiving the driving information, the mobile terminal determines, according to the driving information, whether the connected vehicle is currently in a driving state. When the connected vehicle is in the driving state, the mobile terminal performs step 204, or otherwise, when the connected vehicle is in a non-driving state, performs step 206.

The non-driving state may include a stopping state and a parking state, for example, parking a vehicle in a parking lot.

For example, if the gear information in the driving information indicates that the vehicle is currently in a neutral gear, the vehicle speed information indicates that a vehicle speed is currently 0, and a handbrake is pulled, it indicates that the vehicle is currently in a parking state, and step 206 may be performed. If the gear information in the driving information indicates that the vehicle is currently in a neutral gear, the vehicle speed information indicates that a vehicle speed is currently 0, and a handbrake is not pulled, it indicates that the vehicle is currently in a stopping state, and step 206 may also be performed. Otherwise, if the gear information in the driving information indicates that the vehicle is currently not in a neutral gear, the vehicle speed information indicates that a vehicle speed is currently greater than 0, it indicates that the vehicle is currently in the driving state, and step 204 may be performed.

Figure 2C:
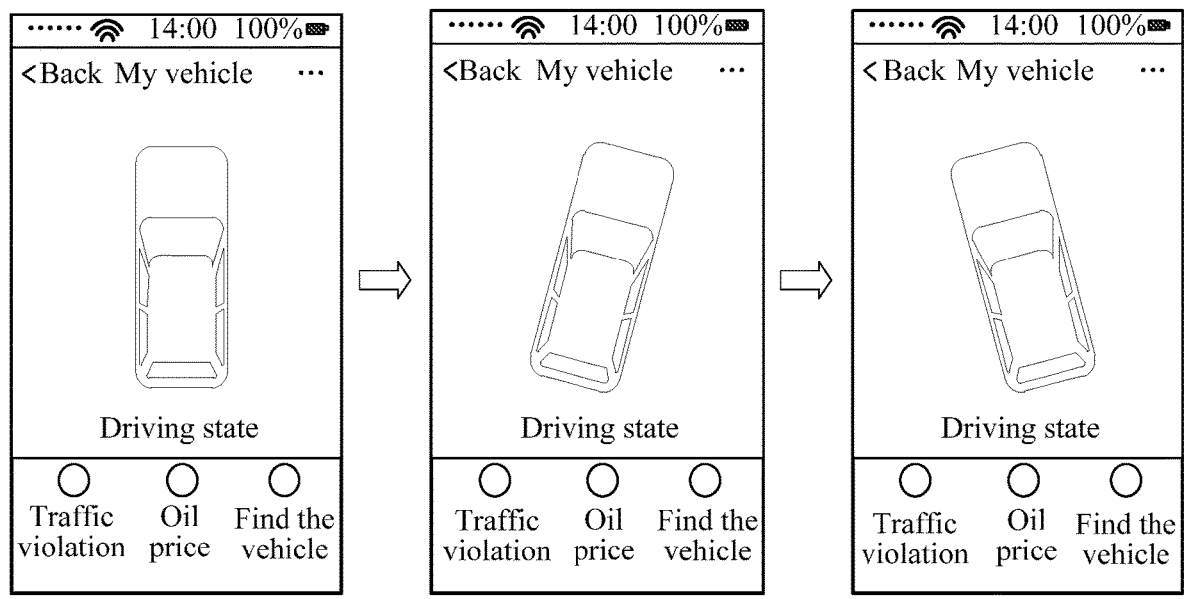
FIG. 2C is another exemplary diagram of a display image of a virtual vehicle in a vehicle diagnosis system according to an embodiment of the present disclosure.
Figure 2D:
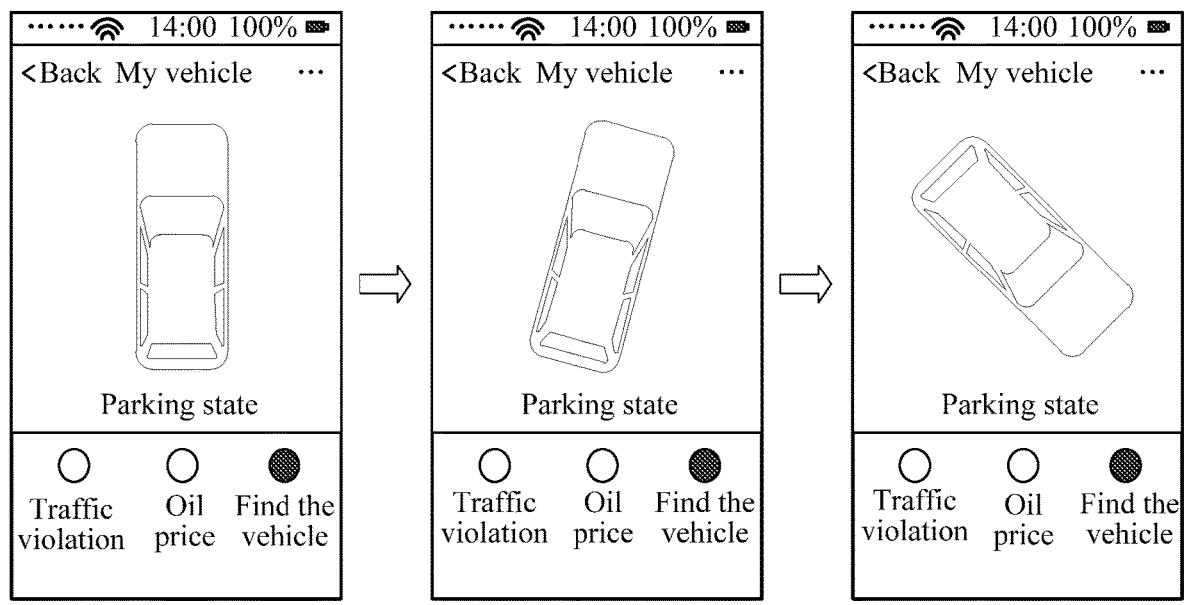
FIG. 2D is still another exemplary diagram of a display image of a virtual vehicle in a vehicle diagnosis system according to an embodiment of the present disclosure.

Optionally, referring to FIG. 2C and FIG. 2D, a driving state and a parking state of the connected vehicle are displayed on the screen of the mobile terminal respectively.

204. When determining that the connected vehicle is currently in the driving state, the mobile terminal acquires head information of the connected vehicle in real time, and performs step 205, the head information indicating an orientation of a head of the connected vehicle.

The head information may be provided by the vehicle diagnosis system. For example, the vehicle diagnosis system may position the orientation of the head of the vehicle in real time, to obtain the head information, and then send the head information to the mobile terminal.

The vehicle diagnosis system may position the orientation of the head of the vehicle in real time in various manners. For example, the orientation of the head of the vehicle may be determined by installing a positioning apparatus at the head or a tail of the vehicle.

205. The mobile terminal adjusts an orientation of a head of the virtual vehicle in the display image in real time according to the head information, so that the orientation of the head of the virtual vehicle keeps consistency with the orientation of the head of the connected vehicle.

For example, the orientation of the head of the virtual vehicle in the display image may be adjusted in real time by using a gyroscope of the mobile terminal according to the head information, so that the orientation of the head of the virtual vehicle keeps consistency with the orientation of the head of the connected vehicle. For example, referring to FIG. 2C, when the head of the connected vehicle drives to the right, the orientation of the head of the virtual vehicle in the display image also turns to the right, and when the head of the connected vehicle drives to the left, the orientation of the head of the virtual vehicle in the display image also turns to the left.

A specific adjustment angle may be calculated by using a deflection degree of the gyroscope. For example, an initial direction of the gyroscope and a current direction of the gyroscope may be acquired, and the deflection degree of the gyroscope is calculated according to an angle between the initial direction of the gyroscope and the current direction. Then, the deflection degree is used as the adjustment angle for adjusting the current direction of the head of the virtual vehicle.

206. When determining that the connected vehicle is currently in a non-driving state, such as a parking state or a stopping state, the mobile terminal acquires positioning information of the connected vehicle, to obtain a vehicle location, and then performs step 207.

The positioning information of the connected vehicle may be provided by the vehicle diagnosis system. For example, the vehicle diagnosis system may position the connected vehicle, to obtain the positioning information, and then send the positioning information to the mobile terminal.

The vehicle diagnosis system may position the vehicle in various manners. For example, the vehicle may be positioned by installing a GPS on the vehicle or by using a base station, and details are not described herein.

207. The mobile terminal positions a current location of the mobile terminal, to obtain current location of the mobile terminal, and then performs step 208.

208. The mobile terminal adjusts the orientation of the head of the virtual vehicle in the display image in real time according to the vehicle location and the current location, so that the head of the virtual vehicle is oriented towards the vehicle location.

For example, the orientation of the head of the virtual vehicle in the display image may be adjusted in real time by using a gyroscope of the mobile terminal according to the vehicle location and the current location, so that the head of the virtual vehicle is oriented towards the vehicle location. For example, referring to FIG. 2D, when the vehicle location is in the northeast of the current location of the mobile terminal, the orientation of the head of the virtual vehicle in the display image may be turned to a northeast direction, so that the head of the virtual vehicle is oriented towards the vehicle location. For another example, when the user continues walking, the vehicle location is in a southeast direction of the current location of the mobile terminal. In this case, the orientation of the head of the virtual vehicle in the display image may be turned to the southeast direction, so that the head of the virtual vehicle is oriented towards the vehicle location.

A specific adjustment angle may be calculated by using the deflection degree of the gyroscope, and details are not described herein again.

In this way, when the user parks the vehicle at a place and leaves the vehicle with the data processing apparatus such as the mobile terminal, the vehicle diagnosis system may send the vehicle location to the data processing apparatus. Then when the user needs to find the vehicle, for example, the user clicks a key (referring to FIG. 2D) of "Find the vehicle" on the screen, the data processing apparatus may label a direction of the vehicle according to the vehicle location (that is, perform step 208), so that it is convenient for the user to find the vehicle.

Optionally, to enable the user to find the vehicle of the user more conveniently, corresponding navigation information for reaching the location of the vehicle may further be generated for the reference of the user. That is, the data processing method for a vehicle diagnosis system may further include steps 209 and 210 as below.

209. The mobile terminal receives a navigation request sent by a user.

For example, a trigger key for the navigation request may be provided at a preset location or a hidden menu of the display image, and then when the user selects the trigger key, the navigation request may be triggered.

210. The mobile terminal generates, according to the navigation request, a navigation route for reaching the vehicle location of the connected vehicle, and displays the navigation route on the screen of the mobile terminal.

The navigation route may be displayed in a form of text information, a two-dimensional map, or a three-dimensional map, and details are not described herein.

Optionally, when the vehicle diagnosis request is received, a vehicle condition of the connected vehicle may be scanned, and corresponding vehicle condition information may be provided for the user. For example, the vehicle condition information may be displayed at a preset location on the display image of the virtual vehicle, or the vehicle condition information may be sent to the user by using a short message, a text message, a popup window, another message form, or the like, and details are not described herein.

It may be learned from above that the mobile terminal in this embodiment may acquire information about a connected vehicle, and generate a display image of a virtual vehicle according to the information about the connected vehicle; then acquire driving information of the connected vehicle from a vehicle diagnosis system; determine, according to the driving information, whether the vehicle is currently in a driving state; and adjust an orientation of a head of the virtual vehicle in the display image if the connected vehicle is in the driving state, so that the orientation of the head of the virtual vehicle keeps consistency with an orientation of a head of the connected vehicle; or adjust an orientation of a head of the virtual vehicle in the display image if the connected vehicle is in a non-driving state, such as a parking state, so that the head of the virtual vehicle is oriented to a location of the connected vehicle, thereby displaying a vehicle condition in real time, dynamically, and truly. Moreover, the mobile terminal can more accurately determine the location of the physical vehicle by using the orientation of the head of the virtual vehicle in the display image. Therefore, compared with the solution in the existing technology that a display image of a virtual vehicle is fixed, the mobile terminal of present disclosure can more accurately position a vehicle. In conclusion, in present disclosure, not only a vehicle condition can be fed back in real time, dynamically and truly, but also a vehicle can be more accurately positioned, so that it is especially convenient for a user to find the vehicle.

Embodiment 3

Figure 3A:
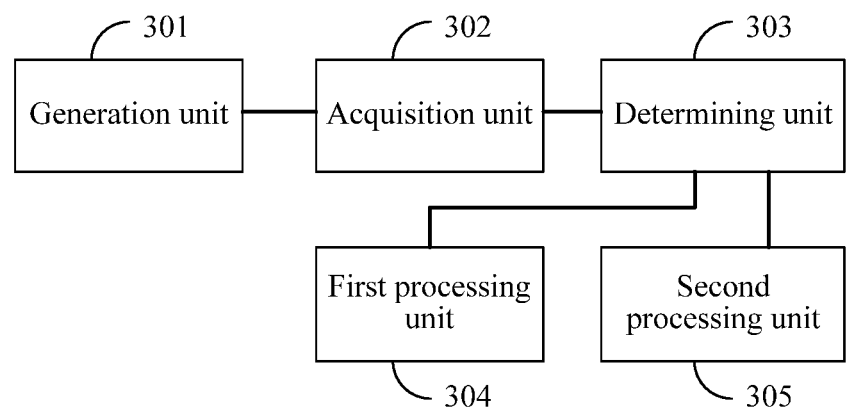
FIG. 3A is a schematic structural diagram of a vehicle diagnosis system according to an embodiment of the present disclosure.

To better implement the foregoing methods, an embodiment of the present disclosure further provides a data processing apparatus. As shown in FIG. 3A, the data processing apparatus includes a generation unit 301, an acquisition unit 302, a determining unit 303, a first processing unit 304, and a second processing unit 305 as below.

(1) The Generation Unit 301:

The generation unit 301 is configured to: acquire information about a vehicle connected to a device, to obtain information about the connected vehicle, and generate a display image of a virtual vehicle according to the information about the connected vehicle.

For example, the generation unit 301 may be specifically configured to: receive the information about the connected vehicle sent by a vehicle diagnosis system corresponding to the connected vehicle, then generate the display image of the virtual vehicle according to the information about the connected vehicle, and display the display image on a local (for example, a mobile terminal to which the data processing apparatus belongs) screen.

Alternatively, for another example, the generation unit 301 may be specifically configured to: receive the information about the connected vehicle input by a user, then generate the display image of the virtual vehicle according to the information about the connected vehicle, and display the display image on a local (for example, a mobile terminal to which the data processing apparatus belongs) screen.

(2) The Acquisition Unit 302:

The acquisition unit 302 is configured to acquire driving information of the connected vehicle.

For example, the acquisition unit 302 may be specifically configured to receive the driving information of the connected vehicle sent by the vehicle diagnosis system, the driving information being collected by the vehicle diagnosis system.

The driving information is information that can reflect whether the vehicle is currently in a driving state, and may include information such as gear information, vehicle speed information, and whether an engine of the vehicle is running.

(3) The Determining Unit 303:

The determining unit 303 is configured to determine, according to the driving information, whether the connected vehicle is currently in a driving state.

The non-driving state may include a stopping state and a parking state, for example, parking a vehicle in a parking lot.

(4) The First Processing Unit 304:

The first processing unit 304 is configured to adjust an orientation of a head of the virtual vehicle in the display image when the determining unit 303 determines that the connected vehicle is in the driving state, so that the orientation of the head of the virtual vehicle keeps consistency with an orientation of a head of the connected vehicle. For example, the first processing unit 304 may be configured to:

acquire head information of the connected vehicle in real time, the head information indicating the orientation of the head of the connected vehicle, and then adjust the orientation of the head of the virtual vehicle in the display image in real time according to the head information, so that the orientation of the head the virtual vehicle keeps consistency with the orientation of the head of the connected vehicle.

For example, the orientation of the head of the virtual vehicle in the display image may be adjusted in real time by using a local (that is, the data processing apparatus or a mobile terminal to which the data processing apparatus belongs) gyroscope according to the head information, so that the orientation of the head of the virtual vehicle keeps consistency with the orientation of the head of the connected vehicle.

The head information may be provided by the vehicle diagnosis system. For example, the vehicle diagnosis system may position the orientation of the head of the vehicle in real time, to obtain the head information, and then send the head information to the first processing unit 304.

The vehicle diagnosis system may position the orientation of the head of the vehicle in real time in various manners.

For example, the orientation of the head of the vehicle may be determined by installing a positioning apparatus at the head or a vehicle tail.

(5) The Second Processing Unit 305:

The second processing unit 305 is configured to adjust an orientation of a head of the virtual vehicle in the display image when the determining unit 303 determines that the connected vehicle is in a non-driving state, so that the head of the virtual vehicle is oriented to a location of the connected vehicle. For example, the second processing unit 305 may be configured to:

acquire positioning information of the connected vehicle, to obtain a vehicle location; position a current location of the device, to obtain current location information; and adjust the orientation of the head of the virtual vehicle in the display image in real time according to the vehicle location and the current location information, so that the head of the virtual vehicle is oriented to the vehicle location.

For example, the orientation of the head of the virtual vehicle in the display image may be adjusted in real time by using a local (that is, the data processing apparatus or a mobile terminal to which the data processing apparatus belongs) gyroscope according to the vehicle location and the current location information, so that the head of the virtual vehicle is oriented to the vehicle location.

The positioning information of the connected vehicle may be provided by the vehicle diagnosis system. For example, the vehicle diagnosis system may position the connected vehicle, to obtain the positioning information, and then send the positioning information to the second processing unit 305.

In this way, when the user parks the vehicle at a place and leaves the vehicle with the data processing apparatus such as the mobile terminal, the vehicle diagnosis system may send the vehicle location to the data processing apparatus, and then the data processing apparatus may label a direction of the vehicle according to the vehicle location, so that it is convenient for the user to find the vehicle.

The vehicle diagnosis system may position the vehicle in various manners. For example, the vehicle may be positioned by installing a GPS on the vehicle or by using a base station, and details are not described herein.

Figure 3B:
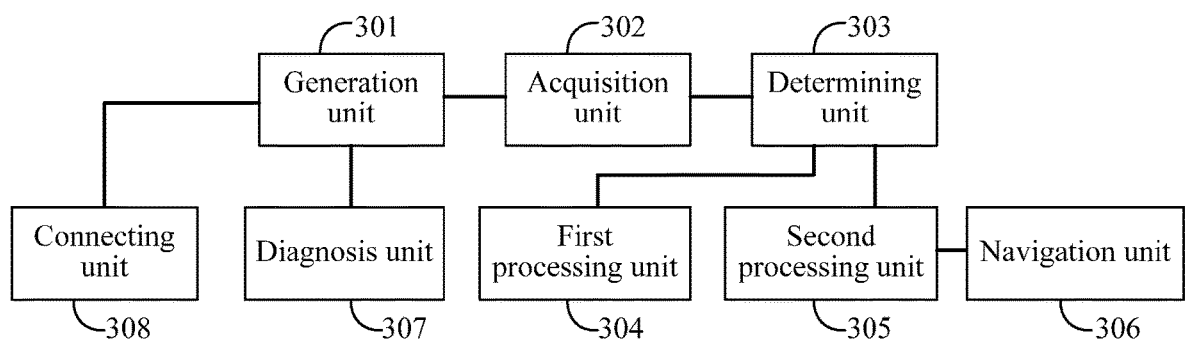
FIG. 3B is another schematic structural diagram of a vehicle diagnosis system according to an embodiment of the present disclosure.

Optionally, to enable the user to find the vehicle of the user more conveniently, corresponding navigation information for reaching the location of the vehicle may further be generated for the reference of the user. That is, as shown in FIG. 3B, the data processing apparatus may further include a navigation unit 306 as below.

The navigation unit 306 may further be configured to: receive a navigation request; generate, according to the navigation request, a navigation route for reaching the location of the connected vehicle; and display the navigation route.

Optionally, a vehicle condition of the connected vehicle may further be scanned, and corresponding vehicle condition information may be provided for the user. That is, as shown in FIG. 3B, the data processing apparatus may further include a diagnosis unit 307 as below.

The diagnosis unit 307 is configured to: receive a vehicle diagnosis request; scan a vehicle condition of the connected vehicle according to the vehicle diagnosis request, to obtain vehicle condition information; and display the vehicle condition information.

For example, after receiving the vehicle diagnosis request, the diagnosis unit 307 may deliver a diagnosis instruction to the vehicle diagnosis system according to the vehicle diagnosis request, so that the vehicle diagnosis system scans the vehicle condition of the connected vehicle according to the diagnosis instruction, receives a result of the scanning returned by the vehicle diagnosis system, to obtain the vehicle condition information, and displays the vehicle condition information. For example, the vehicle condition information may be displayed at a preset location on the display image of the virtual vehicle, or the vehicle condition information may be sent to the user by using a short message, a text message, a popup window, another message form, or the like.

In addition, it should be noted that, the connected vehicle may be preset in the vehicle diagnosis system by the user, or may be connected to the vehicle diagnosis system by the vehicle diagnosis system. That is, as shown in FIG. 3B, the data processing apparatus may further include a connecting unit 308 as below.

The connecting unit 308 is configured to: receive a connecting request, the connecting request carrying an identifier of a vehicle that needs to be monitored; and establish, according to the connecting request, a connecting relationship with the vehicle corresponding to the identifier of the vehicle.

In this case, the generation unit 301 may be specifically configured to: acquire the information about the connected vehicle based on the connecting relationship, and generate the display image of the virtual vehicle according to the information about the connected vehicle.

The vehicle diagnosis system may be specifically integrated into a device such as a mobile terminal, and the mobile terminal may be specifically a device such as a mobile phone or a tablet computer.

During specific implementation, each unit above may be implemented as an independent entity, or may be arbitrarily combined, so as to be implemented as a same entity or several entities. For a specific implementation of each unit above, refer to the foregoing method embodiments, and details are not described herein again.

It may be learned from above that the generation unit 301 of the data processing apparatus in this embodiment may acquire information about a connected vehicle, and generate a display image of a virtual vehicle according to the information about the connected vehicle; then the acquisition unit 302 acquires driving information of the connected vehicle from a vehicle diagnosis system; the determining unit 303 determines, according to the driving information, whether the vehicle is currently in a driving state; and the first processing unit 304 adjusts an orientation of a head of the virtual vehicle in the display image if the connected vehicle is in the driving state, so that the orientation of the head of the virtual vehicle keeps consistency with an orientation of a head of the connected vehicle; or the second processing unit 305 adjusts an orientation of a head of the virtual vehicle in the display image if the connected vehicle is in a non-driving state, such as a parking state, so that the head of the virtual vehicle is oriented to a location of the connected vehicle, thereby displaying a vehicle condition in real time, dynamically, and truly. Moreover, the data processing apparatus can more accurately determine the location of the physical vehicle by using the orientation of the head of the virtual vehicle in the display image. Therefore, compared with the solution in the existing technology that a display image of a virtual vehicle is fixed, the data processing apparatus can more accurately position a vehicle. In conclusion, by means of the solution, not only a vehicle condition can be fed back in real time, dynamically and truly, but also a vehicle can be more accurately positioned, so that it is especially convenient for a user to find the vehicle.

Embodiment 4

In addition, an embodiment of the present disclosure further provides a data processing system, which may include any data processing apparatus according to the embodiments of the present disclosure. For details of the data processing apparatus, refer to Embodiment 3. For example, the data processing apparatus may be as below.

The data processing apparatus is configured to: acquire information about a connected vehicle, and generate a display image of a virtual vehicle according to the information about the connected vehicle; acquire driving information of the connected vehicle; determine, according to the driving information, whether the vehicle is currently in a driving state; and adjust an orientation of a head of the virtual vehicle in the display image if the connected vehicle is in the driving state, so that the orientation of the head of the virtual vehicle keeps consistency with an orientation of a head of the connected vehicle; or adjust an orientation of a head of the virtual vehicle in the display image if the connected vehicle is in a non-driving state, so that the head of the virtual vehicle is oriented to a location of the connected vehicle.

For example, the data processing apparatus may be specifically configured to: when it is determined that the connected vehicle is in the driving state, acquire head information of the connected vehicle in real time, the head information indicating the orientation of the head of the connected vehicle; and adjust the orientation of the head of the virtual vehicle in the display image in real time according to the head information, so that the orientation of the head of the virtual vehicle keeps consistency with the orientation of the head of the connected vehicle. For example, the data processing apparatus may adjust, by using a local gyroscope (that is, a gyroscope built in a device to which the data processing apparatus belongs), the orientation of the head of the virtual vehicle in the display image in real time according to the head information, so that the orientation of the head of the virtual vehicle keeps consistency with the orientation of the head of the connected vehicle. When it is determined that the connected vehicle is in the non-driving state, such as a parking state or a stopping state, the data processing apparatus may acquire positioning information of the connected vehicle, to obtain a vehicle location; position a current location of the device, to obtain current location information; and adjust the orientation of the head of the virtual vehicle in the display image in real time according to the vehicle location and the current location information, so that the head of the virtual vehicle is oriented to the vehicle location. For example, the data processing apparatus may adjust, by using the local gyroscope, the orientation of the head of the virtual vehicle in the display image in real time according to the vehicle location and the current location information, so that the head of the virtual vehicle is oriented to the vehicle location.

Optionally, to enable the user to find the vehicle of the user more conveniently, corresponding navigation information for reaching the location of the vehicle may further be generated for the reference of the user. That is:

The data processing apparatus may further be configured to: receive a navigation request; generate, according to the navigation request, a navigation route for reaching the location of the connected vehicle; and display the navigation route.

Optionally, a vehicle condition of the connected vehicle may further be scanned, and corresponding vehicle condition information may be provided for the user. That is:

The data processing apparatus may further be configured to: receive a vehicle diagnosis request; scan a vehicle condition of the connected vehicle according to the vehicle diagnosis request, to obtain vehicle condition information; and display the vehicle condition information.

For example, after the vehicle diagnosis request is received, a diagnosis instruction may be delivered to the vehicle diagnosis system according to the vehicle diagnosis request, so that the vehicle diagnosis system scans the vehicle condition of the connected vehicle according to the diagnosis instruction, receives a result of the scanning returned by the vehicle diagnosis system, to obtain the vehicle condition information, and then displays the vehicle condition information. For example, the vehicle condition information may be displayed at a preset location on the display image of the virtual vehicle, or the vehicle condition information may be sent to the user by using a short message service message, a popup window, another message form, or the like.

Optionally, the data processing system may further include another device, such as a vehicle diagnosis system as below.

The vehicle diagnosis system may be configured to provide information about a connected vehicle and driving information of the connected vehicle for the data processing apparatus.

For a specific implementation of each device above, refer to the foregoing embodiments, and details are not described herein again.

The data processing system may include any data processing apparatus provided in the embodiments of the present disclosure, and may therefore achieve beneficial effects achieved by any data processing apparatus provided in the embodiments of the present disclosure. For details, refer to the foregoing embodiments, and details are not described herein again.

Embodiment 5

Figure 4:
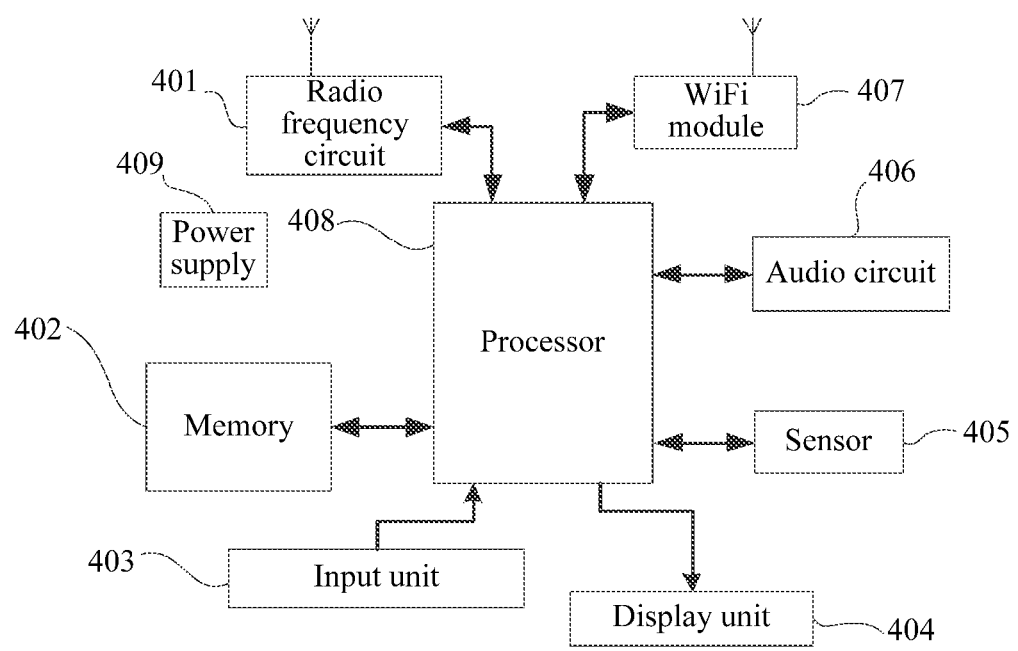
FIG. 4 is a schematic structural diagram of a mobile terminal according to an embodiment of the present disclosure.

Correspondingly, an embodiment of the present disclosure further provides a mobile terminal, which may include any data processing apparatus provided in the embodiments of the present disclosure. As shown in FIG. 4, the mobile terminal may include components such as a radio frequency (RF) circuit 401, a memory 402 including one or more computer readable storage media, an input unit 403, a display unit 404, a sensor 405, an audio circuit 406, a wireless fidelity (WiFi) module 407, a processor 408 including one or more processing cores, and a power supply 409. Persons skilled in the art may understand that, a structure of the mobile terminal shown in FIG. 4 does not constitute a limitation to the mobile terminal, and the mobile terminal may include more components or fewer components than those shown in the figure, or some components may be combined, or a different component deployment may be used.

The RF circuit 401 may be configured to receive and send signals in an information receiving and sending process or a call process. Particularly, after the RF circuit 401 receives downlink information from a base station, the RF circuit 401 delivers the downlink information to one or more processors 408 for processing, and sends related uplink data to the base station. Generally, the RF circuit 401 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 401 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Message Service (SMS), and the like.

The memory 402 may be configured to store a software program and module. The processor 408 runs the software program and module stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data (such as audio data and an address book) created according to use of the mobile terminal. In addition, the memory 402 may include a high speed random access memory, and may also include a non-volatile memory, such as at least one magnetic disk storage device, a flash memory, or another volatile solid-state storage device. Correspondingly, the memory 402 may further include a memory controller, so as to provide access of the processor 408 and the input unit 403 to the memory 402.

The input unit 403 may be configured to receive input digit or character information, and generate a keyboard, mouse, joystick, optical, or track ball signal input related to the user setting and function control. Specifically, in a specific embodiment, the input unit 403 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 408. Moreover, the touch controller can receive and execute a command sent from the processor 408. In addition, a touch-sensitive surface may be a resistive, capacitive, infrared, or surface sound wave typed touch-sensitive surface. In addition to the touch-sensitive surface, the input unit 403 may further include the another input device. Specifically, the another input device may include, but is not limited to, one or more of a physical keyboard, a functional key (such as a volume control key or a switch key), a track ball, a mouse, and a joystick.

The display unit 404 may be configured to display information input by the user or information provided for the user, and various graphical user interfaces of the mobile terminal. The graphical user interfaces may be formed by a graph, a text, an icon, a video, or any combination thereof. The display unit 404 may include a display panel. Optionally, the display panel 404 may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 408, to determine the type of the touch event. Then, the processor 408 provides a corresponding visual output on the display panel according to the type of the touch event. Although, in FIG. 4, the touch-sensitive surface and the display panel are used as two separate components to implement input and output functions, in some embodiments, the touch-sensitive surface and the display panel may be integrated to implement the input function and output functions.

The mobile terminal may further include at least one sensor 405, such as an optical sensor, a motion sensor, and other sensors. Specifically, the optical sensor may include an ambient light sensor and a proximity sensor. The ambient light sensor can adjust luminance of the display panel according to brightness of the ambient light. The proximity sensor may switch off the display panel and/or backlight when the mobile terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile terminal, are not further described herein.

The audio circuit 406, a speaker, and a microphone may provide an audio interface between the user and the mobile terminal. The audio circuit 406 may convert received audio data into an electric signal and transmit the electric signal to the speaker. The speaker converts the electric signal into a sound signal for output. On the other hand, the microphone converts a collected sound signal into an electric signal. The audio circuit 406 receives the electric signal and converts the electric signal into audio data, and outputs the audio data to the processor 408 for processing. Then, the processor 408 sends the audio data to, for example, another mobile terminal by using the RF circuit 401, or outputs the audio data to the memory 402 for further processing. The audio circuit 406 may further include an earplug jack, to provide communication between a peripheral earphone and the mobile terminal.

WiFi is a short-distance wireless transmission technology. The mobile terminal may help, by using the WiFi module 407, the user to receive and send emails, browse a web page, access streaming media, which provides a wireless broadband Internet access for the user. Although the WiFi module 407 is shown in FIG. 4, it may be understood that the WiFi module is not a necessary component of the mobile terminal, and when required, the WiFi module may be omitted as long as the scope of the essence of the present disclosure is not changed.

The processor 408 is the control center of the mobile terminal, and is connected to various parts of an entire mobile phone by using various interfaces and lines. By running or performing the software program and/or module stored in the memory 402, and invoking the data stored in the memory 402, the processor 408 performs various functions of the mobile terminal and processes the data, thereby performing overall monitoring on the mobile phone. Optionally, the processor 408 may include the one or more processing cores. Preferably, the processor 408 may integrate an application processor and a modem. The application processor mainly processes an operating system, a user interface, an application program, and the like. The modem mainly processes wireless communication. It may be understood that the foregoing modem may either not be integrated into the processor 408.

The mobile terminal further includes the power supply 409 (such as a battery) for supplying power to the components. Preferably, the power supply may be logically connected to the processor 408 by using a power management system, thereby implementing functions such as charging, discharging and power consumption management by using the power management system. The power supply 409 may further include one or more of any component such as a direct current or alternating current power supply, a recharging system, a power failure detection circuit, a power supply converter or inverter, and a power supply state indicator.

Although not shown in the figure, the mobile terminal may further include a camera, a Bluetooth module, and the like, which are not further described herein. Specifically, in this embodiment, the processor 408 in the mobile terminal may load executable files corresponding to processes of one or more application programs to the memory 402 according to the following instructions, and the processor 408 runs the application programs stored in the memory 402 to implement various functions:

acquiring information about a vehicle that has a preset association relationship with a device, to obtain information about the connected vehicle, and generating a display image of a virtual vehicle according to the information about the connected vehicle; acquiring driving information of the connected vehicle; determining, according to the driving information, whether the vehicle is currently in a driving state; and adjusting an orientation of a head of the virtual vehicle in the display image if the connected vehicle is in the driving state, so that the orientation of the head of the virtual vehicle keeps consistency with an orientation of a head of the connected vehicle; or adjusting an orientation of a head of the virtual vehicle in the display image if the connected vehicle is in a non-driving state, so that the head of the virtual vehicle is oriented to a location of the connected vehicle.

For example, when it is determined that the connected vehicle is in the driving state, head information of the connected vehicle may be acquired in real time, the head information indicating the orientation of the head of the connected vehicle; and then, the orientation of the head of the virtual vehicle in the display image is adjusted in real time according to the head information, so that the orientation of the head of the virtual vehicle keeps consistency with the orientation of the head of the connected vehicle. For example, the orientation of the head of the virtual vehicle in the display image may be adjusted in real time by using a local (that is, in the mobile terminal) gyroscope according to the head information, so that the orientation of the head of the virtual vehicle keeps consistency with the orientation of the head of the connected vehicle.

The head information may be provided by the vehicle diagnosis system. For example, the vehicle diagnosis system may position the orientation of the head of the vehicle in real time, to obtain the head information, and then send the head information to the mobile terminal. The vehicle diagnosis system may position the orientation of the head of the vehicle in real time in various manners. For example, the orientation of the head of the vehicle may be determined by installing a positioning apparatus at the head or a vehicle tail.

For another example, when it is determined that the connected vehicle is in a non-driving state, such as a parking or stopping state, positioning information of the connected vehicle may be acquired, to obtain a vehicle location; a current location of the mobile device is positioned, to obtain current location information; and the orientation of the head of the virtual vehicle in the display image is adjusted in real time according to the vehicle location and the current location information, so that the head of the virtual vehicle is oriented to the vehicle location. For example, the orientation of the head of the virtual vehicle in the display image may be adjusted in real time by using a local (that is, the mobile terminal) gyroscope according to the vehicle location and the current location information, so that the head of the virtual vehicle is oriented to the vehicle location.

The positioning information of the connected vehicle may be provided by the vehicle diagnosis system. For example, the vehicle diagnosis system may position the connected vehicle, to obtain the positioning information, and then send the positioning information to the mobile terminal.

An embodiment of the present disclosure further provides a storage medium. Optionally, in this embodiment, the foregoing storage medium is configured to store program code used for executing the data processing method for a vehicle diagnosis system.

Optionally, in this embodiment, the foregoing storage medium may be located on at least one of multiple network devices in the network shown in the foregoing embodiment.

Optionally, in this embodiment, the storage medium is configured to store the program code used for executing the following steps: acquiring information about a vehicle connected to a device, to obtain information about the connected vehicle, and generating a display image of a virtual vehicle according to the information about the connected vehicle; acquiring driving information of the connected vehicle; determining, according to the driving information, whether the connected vehicle is currently in a driving state; and adjusting an orientation of a head of the virtual vehicle in the display image if the connected vehicle is in the driving state, so that the orientation of the head of the virtual vehicle keeps consistency with an orientation of a head of the connected vehicle; or adjusting an orientation of a head of the virtual vehicle in the display image if the connected vehicle is in a non-driving state, so that the head of the virtual vehicle is oriented to a location of the connected vehicle.

Optionally, in this embodiment, the storage medium is configured to store the program code used for executing the following steps: acquiring head information of the connected vehicle in real time, the head information indicating the orientation of the head of the connected vehicle; and adjusting the orientation of the head of the virtual vehicle in the display image in real time according to the head information, so that the orientation of the head of the virtual vehicle keeps consistency with the orientation of the head of the connected vehicle.

Optionally, in this embodiment, the storage medium is configured to store the program code used for executing the following step: adjusting, by using a gyroscope built in the device, the orientation of the head of the virtual vehicle in the display image in real time according to the head information, so that the orientation of the head of the virtual vehicle keeps consistency with the orientation of the head of the connected vehicle.

Optionally, in this embodiment, the storage medium is configured to store the program code used for executing the following steps: acquiring positioning information of the connected vehicle, to obtain a vehicle location; positioning a current location of the device, to obtain current location information; and adjusting the orientation of the head of the virtual vehicle in the display image in real time according to the vehicle location and the current location information, so that the head of the virtual vehicle is oriented to the vehicle location.

Optionally, in this embodiment, the storage medium is configured to store the program code used for executing the following steps: before the acquiring information about a connected vehicle, receiving a connecting request, the connecting request carrying an identifier of a vehicle that needs to be monitored; establishing, according to the connecting request, a connecting relationship with the vehicle corresponding to the identifier of the vehicle; and acquiring the information about the connected vehicle based on the connecting relationship.

Optionally, in this embodiment, the storage medium is configured to store the program code used for executing the following steps: receiving a vehicle diagnosis request; scanning a vehicle condition of the connected vehicle according to the vehicle diagnosis request, to obtain vehicle condition information; and displaying the vehicle condition information.

Optionally, in this embodiment, the storage medium is configured to store the program code used for executing the following steps: after the adjusting an orientation of a head of the virtual vehicle in the display image, so that the head of the virtual vehicle is oriented to a location of the connected vehicle, receiving a navigation request; generating, according to the navigation request, a navigation route for reaching the location of the connected vehicle; and displaying the navigation route.

For specific implementation of each operation above and a corresponding beneficial effect, refer to the foregoing embodiments, and details are not described herein again.

Persons of ordinary skill in the art understand that all or part of the steps of the methods in the embodiments may be implemented by a program instructing relevant hardware. The program may be stored in a computer readable storage medium, and the storage medium may be a read-only memory (ROM), a random access memory (RAM), a magnetic disk, an optical disk, and so on.

The data processing method for a vehicle diagnosis system, a data processing apparatus, and a data processing system provided in the embodiments of the present disclosure are described above in detail. Although the principles and implementations of the present disclosure are described by using specific embodiments in this specification, the foregoing descriptions of the embodiments are only intended to help understand the method and core idea of the method of the present disclosure. Meanwhile, persons of ordinary skill in the art may make modifications to the specific implementation manners and application range according to the idea of the present disclosure. In conclusion, the content of the specification should not be construed as a limitation to the present disclosure.

What is claimed is:

1. A method for processing information of a vehicle, the method comprising:

acquiring, by a device comprising a display, a memory, and a processor in communication with the memory and the display, information about a connected vehicle which is connected to the device through a network, to obtain the information about the connected vehicle;

generating, by the device, a display image of a virtual vehicle according to the information about the connected vehicle to display the display image of the virtual vehicle on the display of the device;

acquiring, by the device, driving information of the connected vehicle;

processing, by the device, the driving information to determine whether the connected vehicle is currently in a driving state;

when it is determined that the connected vehicle is in the driving state, adjusting, by the device based on a deflection degree of a gyroscope in the device, an orientation of a head of the virtual vehicle in the display image to keep consistency with an orientation of a head of the connected vehicle; and when it is determined that the connected vehicle is in a non-driving state, receiving, by the device, a pre-determined option on the display, and in response to receiving the pre-determined option on the display, adjusting, by the device, the orientation of the head of the virtual vehicle in the display image so that the head of the virtual vehicle in the display image is oriented towards a location of the connected vehicle.

2. The method according to claim 1, wherein the adjusting the orientation of the head of the virtual vehicle in the display image to keep consistency with the orientation of the head of the connected vehicle comprises:

acquiring, by the device, head information of the connected vehicle in real time, the head information indicating the orientation of the head of the connected vehicle; and adjusting, by the device, the orientation of the head of the virtual vehicle in the display image in real time according to the head information to keep consistency with the orientation of the head of the connected vehicle.

3. The method according to claim 1, wherein the adjusting the orientation of the head of the virtual vehicle in the display image towards the location of the connected vehicle comprises:

acquiring, by the device, positioning information of the connected vehicle, to obtain a vehicle location;

positioning, by the device, a current location of the device, to obtain current location information; and adjusting, by the device, the orientation of the head of the virtual vehicle in the display image in real time according to the vehicle location and the current location information towards the vehicle location.

4. The method according to claim 1, wherein:

before the acquiring the information about the connected vehicle, the method further comprises:

receiving, by the device, a connecting request, the connecting request comprising an identifier of a vehicle that needs to be monitored; and, establishing, by the device, according to the connecting request, a connecting relationship with a system in the vehicle corresponding to the identifier of the vehicle; and the acquiring the information about the connected vehicle comprises:

acquiring, by the device, the information about the connected vehicle based on the connecting relationship.

5. The method according to claim 1, further comprising:
receiving, by the device, a vehicle diagnosis request;
scanning, by the device, a vehicle condition of the connected vehicle according to the vehicle diagnosis request, to obtain vehicle condition information; and
displaying, by the device, the vehicle condition information.

6. The method according to claim 1, wherein, after the adjusting the orientation of the head of the virtual vehicle in the display image, towards the location of the connected vehicle, the method further comprises:
receiving, by the device, a navigation request;
generating, by the device, according to the navigation request, a navigation route for reaching the location of the connected vehicle; and
displaying, by the device, the navigation route.

7. A device for processing information of a vehicle, the device comprising:
a display;
a memory storing instructions; and
a processor in communication with the memory and the display, wherein, when the processor executes the instructions, the processor is configured to cause the device to:
acquire information about a connected vehicle which is connected to the device through a network, to obtain the information about the connected vehicle,
generate a display image of a virtual vehicle according to the information about the connected vehicle to display the display image of the virtual vehicle on the display of the device,
acquire driving information of the connected vehicle,
processing, the driving information to determine whether the connected vehicle is currently in a driving state,
when it is determined that the connected vehicle is in the driving state, adjust, based on a deflection degree of a gyroscope in the device, an orientation of a head of the virtual vehicle in the display image to keep consistency with an orientation of a head of the connected vehicle, and
when it is determined that the connected vehicle is in a non-driving state, receive a pre-determined option on the display, and in response to receiving the pre-determined option on the display, adjust the orientation of the head of the virtual vehicle in the display image so that the head of the virtual vehicle in the display image is oriented towards a location of the connected vehicle.

8. The device according to claim 7, wherein, when the processor is configured to cause the device to adjust the orientation of the head of the virtual vehicle in the display image towards the location of the connected vehicle, the processor is configured to cause the device to:
acquire positioning information of the connected vehicle, to obtain a vehicle location;
position a current location of the device, to obtain current location information; and
adjust the orientation of the head of the virtual vehicle in the display image in real time according to the vehicle location and the current location information towards the vehicle location.

9. The device according to claim 7, wherein, when the processor executes the instructions, the processor is configured to further cause the device to:
receive a connecting request, the connecting request comprising an identifier of a vehicle that needs to be monitored;
establish, according to the connecting request, a connecting relationship with a system in the vehicle corresponding to the identifier of the vehicle; and
acquire the information about the connected vehicle based on the connecting relationship.

10. The device according to claim 7, wherein, when the processor executes the instructions, the processor is configured to further cause the device to:
receive a vehicle diagnosis request;
scan a vehicle condition of the connected vehicle according to the vehicle diagnosis request, to obtain vehicle condition information; and
display the vehicle condition information.

11. The device according to claim 7, wherein, when the processor executes the instructions, the processor is configured to further cause the device to:
receive a navigation request;
generate, according to the navigation request, a navigation route for reaching the location of the connected vehicle; and
display the navigation route.

12. A system for processing information of a vehicle, comprising:
a vehicle diagnosis system configured to provide information about a connected vehicle and driving information of the connected vehicle; and
a device, comprising:
a display,
a memory storing instructions, and
a processor in communication with the memory and the display, wherein, when the processor executes the instructions, the processor is configured to cause the device to:
acquire, from the vehicle diagnosis system, the information about the connected vehicle which is connected to the device through a network, to obtain the information about the connected vehicle,
generate a display image of a virtual vehicle according to the information about the connected vehicle to display on the display of the device,
acquire, from the vehicle diagnosis system, the driving information of the connected vehicle to obtain the driving information of the connected vehicle,
process the driving information to determine whether the connected vehicle is currently in a driving state,
when it is determined that the connected vehicle is in the driving state, adjust, based on a deflection degree of a gyroscope in the device, an orientation of a head of the virtual vehicle in the display image to keep consistency with an orientation of a head of the connected vehicle, and
when it is determined that the connected vehicle is in a non-driving state, receive a pre-determined option on the display, and in response to receiving the pre-determined option on the display, adjust the orientation of the head of the virtual vehicle in the display image so that the head of the virtual vehicle in the display image is oriented towards a location of the connected vehicle.

13. The system according to claim 12, wherein, when the processor is configured to cause the device to adjust the orientation of the head of the virtual vehicle in the display image to keep consistency with the orientation of the head of the connected vehicle, the processor is configured to cause the device to:
  acquire head information of the connected vehicle in real time, the head information indicating the orientation of the head of the connected vehicle; and
  adjust the orientation of the head of the virtual vehicle in the display image in real time according to the head information to keep consistency with the orientation of the head of the connected vehicle.

14. The system according to claim 12, wherein, wherein, when the processor is configured to cause the device to adjust the orientation of the head of the virtual vehicle in the display image towards the location of the connected vehicle, the processor is configured to cause the device to:
  acquire positioning information of the connected vehicle, to obtain a vehicle location;
  position a current location of the device, to obtain current location information; and
  adjust the orientation of the head of the virtual vehicle in the display image in real time according to the vehicle location and the current location information towards the vehicle location.

15. The system according to claim 12, wherein, when the processor executes the instructions, the processor is configured to further cause the device to:
  receive a connecting request, the connecting request comprising an identifier of a vehicle that needs to be monitored;
  establish, according to the connecting request, a connecting relationship with a system in the vehicle corresponding to the identifier of the vehicle; and
  acquire the information about the connected vehicle based on the connecting relationship.

16. The system according to claim 12, wherein, when the processor executes the instructions, the processor is configured to further cause the device to:
  receive a vehicle diagnosis request;
  scan a vehicle condition of the connected vehicle according to the vehicle diagnosis request, to obtain vehicle condition information; and
  display the vehicle condition information.

17. The system according to claim 12, wherein, when the processor executes the instructions, the processor is configured to further cause the device to:
  receive a navigation request;
  generate, according to the navigation request, a navigation route for reaching the location of the connected vehicle; and
  display the navigation route.

\* \* \* \* \*